(12) United States Patent
Aubarede et al.

(10) Patent No.: US 6,612,553 B1
(45) Date of Patent: Sep. 2, 2003

(54) SHOCK STRUT OF MCPHERSON WHEEL SUSPENSION

(75) Inventors: Francis Aubarede, Pontgibaud (FR); Antoine Ducloux, La-Roche-Blanche (FR)

(73) Assignee: Compagnie Generale des Etablissements Michelin-Michelin & Cie, Clermont-Ferrand (FR)

( * ) Notice: Subject to any disclaimer, the term of this patent is extended or adjusted under 35 U.S.C. 154(b) by 0 days.

(21) Appl. No.: 09/673,759

(22) PCT Filed: Feb. 9, 2000

(86) PCT No.: PCT/FR00/00302
§ 371 (c)(1),
(2), (4) Date: Jan. 22, 2001

(87) PCT Pub. No.: WO00/48854
PCT Pub. Date: Aug. 24, 2000

(30) Foreign Application Priority Data

Feb. 19, 1999 (FR) .............................................. 99 02075

(51) Int. Cl.⁷ .............................................. B60G 11/56
(52) U.S. Cl. ...................... 267/34; 267/177; 267/179; 267/220; 280/124.151; 280/124.179
(58) Field of Search ................... 267/217, 220, 267/222, 34, 179, 180, 175, 177, 286; 280/124.146, 124.151, 124.179, 124.175; 188/321.11

(56) References Cited

U.S. PATENT DOCUMENTS

| 3,717,354 | A | | 2/1973 | Ritter .......................... 267/222 |
| 3,797,852 | A | * | 3/1974 | Patterson et al. ............ 267/221 |
| 4,474,363 | A | | 10/1984 | Numazawa et al. .......... 267/34 |
| 5,947,549 | A | | 9/1999 | Finley ......................... 296/183 |
| 6,247,688 | B1 | * | 6/2001 | De Fontenay et al. ...... 267/220 |

FOREIGN PATENT DOCUMENTS

| DE | 893 760 | 10/1953 |
| DE | 40 21 314 | 5/1991 |
| DE | 41 10 471 | 10/1991 |
| EP | 0 780 250 | 6/1997 |
| FR | 1 044 393 | 11/1953 |
| FR | 2 297 150 | 8/1976 |
| JP | 09 100858 | 4/1997 |

* cited by examiner

Primary Examiner—Matthew C. Graham
Assistant Examiner—Mariano Sy
(74) Attorney, Agent, or Firm—Baker Botts L.L.P.

(57) ABSTRACT

The invention concerns a shock strut for a McPherson wheel suspension comprising a shock absorber with a body (21) and a rod (22). A coil spring (24) is mounted on a lower spring retainer (23) integral with the shock absorber body (21). The shock strut comprises means capable of blocking the first turn of the spring (24) on and relative to the lower spring retainer (23) in various predetermined positions on the lower spring retainer (23).

9 Claims, 3 Drawing Sheets

Figure 7:
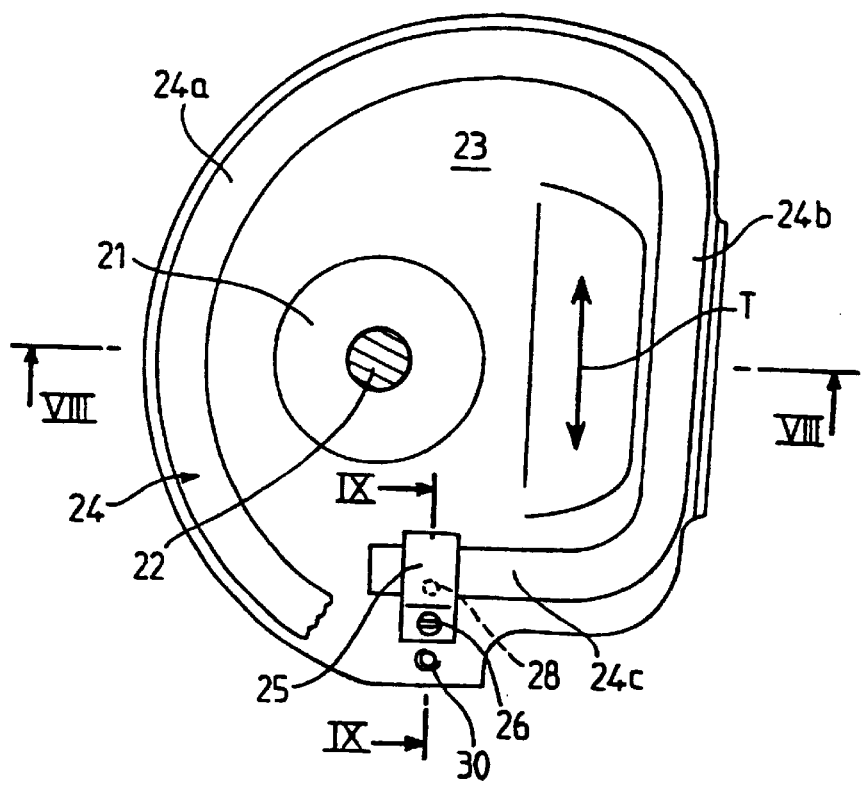

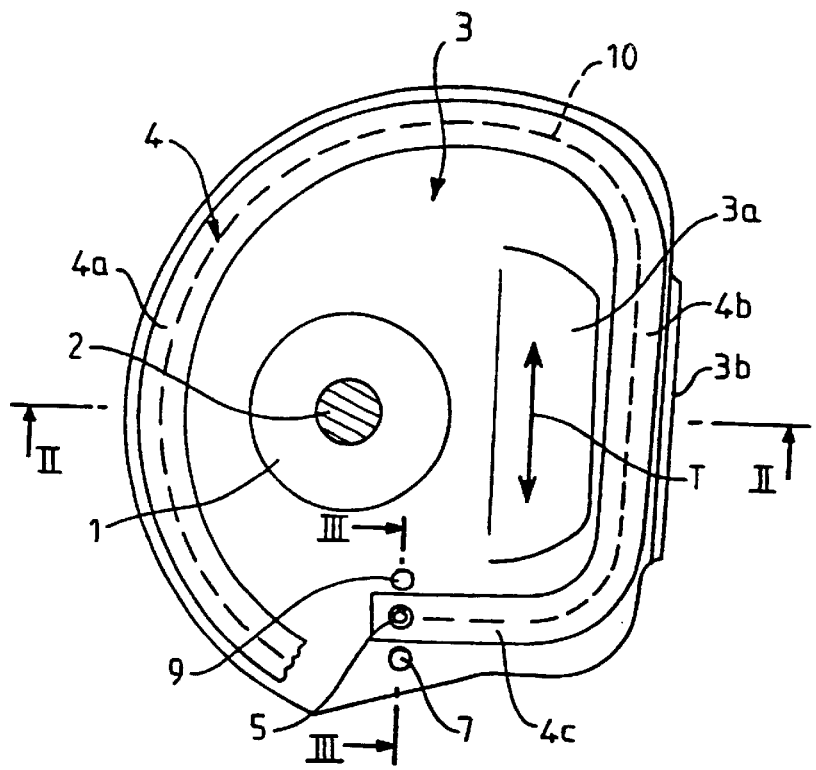
FIG. 1
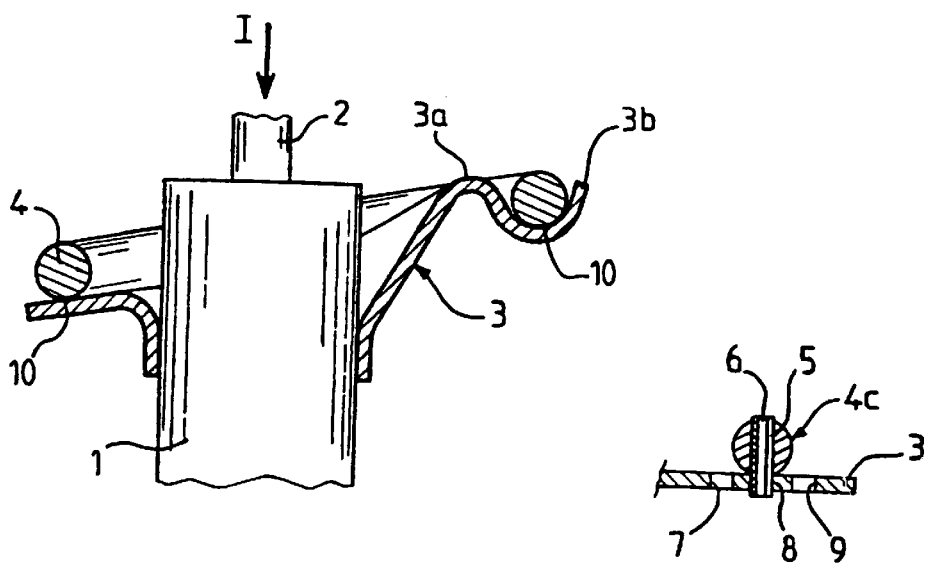
FIG. 2
FIG. 3

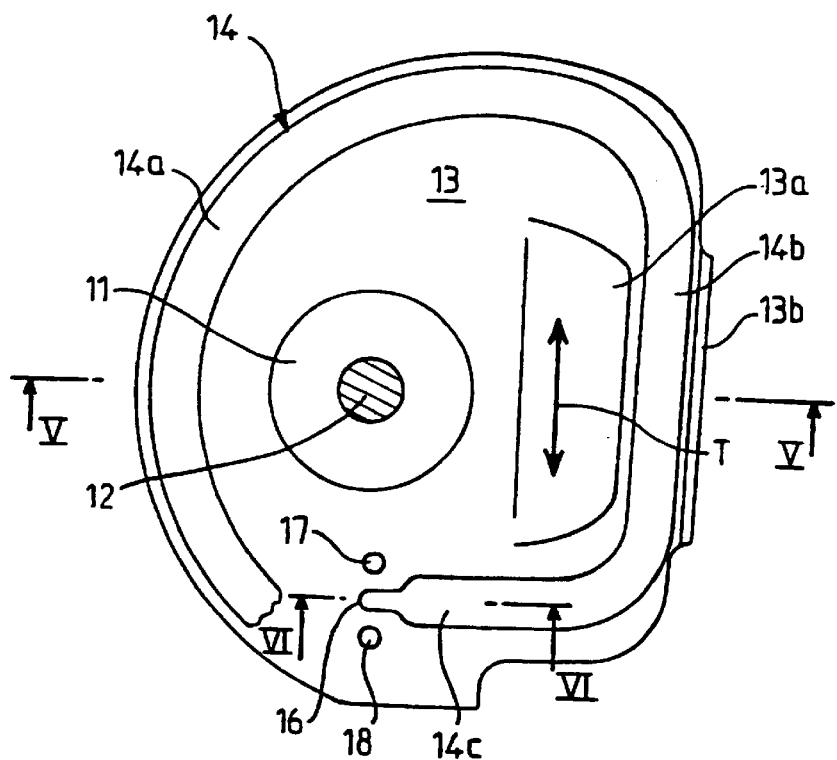
FIG.4
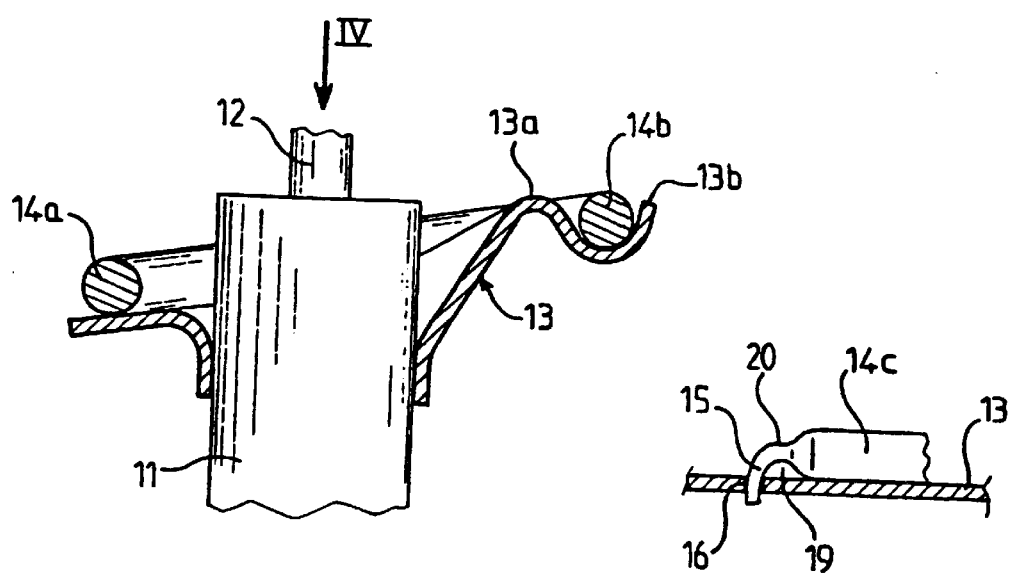
FIG.5
FIG.6

SHOCK STRUT OF MCPHERSON WHEEL SUSPENSION

The invention relates to a strut for a wheel suspension of the Mac Pherson type, comprising a shock absorber with a body and a rod. The rod is surrounded by a coil spring. The coil spring is mounted preloaded between a bottom seat of a lower spring retainer secured to the shock absorber body and an upper seat of an upper spring retainer through which the shock absorber rod passes. The shock absorber body is mounted securely to a hub carrier defining an axis of rotation of the wheel.

Document EP-0 780 250 A2 describes a precise adjustment of a Mac Pherson suspension strut, using adjusting means arranged on the strut and preferably employing an appropriate measurement bench. To obtain correct operation of the strut, the shear force applied to the shock absorber rod has to be precisely controlled. To achieve this, it is known practice for the axis of the spring to be inclined with respect to the axis of the shock absorber rod with an inclination that is calculated to minimize the shear force on the shock absorber rod. However, it is also known that the resultant of the forces exerted by the spring is liable to exert a moment about the pivot axis, which moment has to be well controlled.

One object of the invention is to perfect the state of the art described in document EP-0 780 250 A2 by proposing a new strut allowing quick and precise adjustment and which is simple and economical to manufacture.

The subject of the invention is a strut for a wheel suspension of the Mac Pherson type, comprising a shock absorber with a body and a rod; said rod being surrounded by a coil spring; said coil spring being mounted between a lower spring retainer secured to the shock absorber body and an upper spring retainer through which the shock absorber rod passes; said shock absorber body being mounted secured to a hub carrier defining an axis of rotation of the wheel, characterized in that the strut comprises means capable of immobilizing the first turn of the spring on and with respect to the lower spring retainer in various predetermined positions on the lower spring retainer.

According to other features of the invention:

The spring has one end extending transversely to a direction of translation defined by the various predetermined positions and has a part which is roughly straight and parallel to the direction of translation.

According to a first alternative form of the invention, the said end of the spring extends transversely to the direction of translation and has an indexing configuration.

In a first embodiment of this first alternative form, this indexing configuration involves at least one orifice through which a mechanical means of connection to the lower spring retainer can pass.

In a second embodiment of this first alternative form, this indexing configuration involves at least one curved end which can be inserted in an indexing orifice chosen from a number of orifices made in the lower spring retainer.

According to a second alternative form of the invention, corresponding to a third embodiment, the said end of the spring extends transversely to the direction of translation and can be secured to the lower spring retainer by a means at least partially surrounding said end. This means at least partially surrounding said end of the spring is advantageously configured as a collar or a curved tab. This collar or curved-tab configuration has a means of attachment by a mechanical coupling means to the lower spring retainer.

In both alternative forms of the invention, the mechanical means of coupling to the lower spring retainer is preferably a replaceable means and can be of the screw, pin, bolt or similar type.

As a preference, said straight part parallel to the direction of translation is parallel to the direction of forward travel of a vehicle for which the strut is intended.

Figures 8, 9:
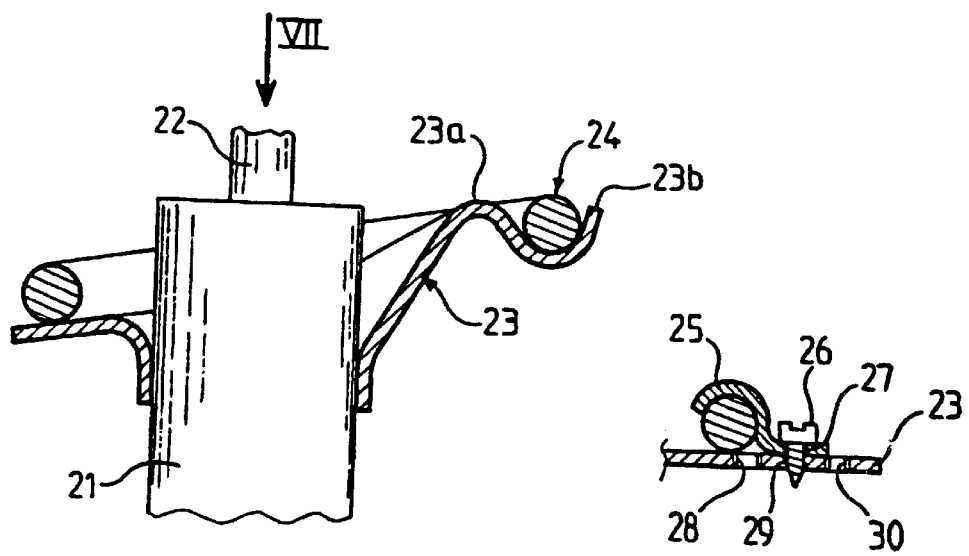

The invention will be better understood by virtue of the description which will follow, given by way of non-limiting example, with reference to the appended drawings in which:

FIG. 1 diagrammatically depicts a view from above in the direction of arrow I of FIG. 2 of a first embodiment of the invention;

FIG. 2 diagrammatically depicts a view in section on the line II—II of FIG. 1 of the first embodiment of the invention;

FIG. 3 diagrammatically depicts a view in section on the line III—III of FIG. 1 of the first embodiment of the invention;

FIG. 4 diagrammatically depicts a view in the direction of arrow IV of FIG. 5 of a second embodiment of the invention;

FIG. 5 diagrammatically depicts a view in section on the line V—V of FIG. 4 of the second embodiment of the invention;

FIG. 6 diagrammatically depicts a view in section on the line VI—VI of FIG. 4 of the second embodiment of the invention;

FIG. 7 diagrammatically depicts a view in the direction of arrow VII of FIG. 8 of a third embodiment of the invention;

FIG. 8 diagrammatically depicts a view in section on the line VIII—VIII of FIG. 7 of the third embodiment of the invention;

FIG. 9 diagrammatically depicts a view in section on the line IX—IX of FIG. 7 of the third embodiment of the invention.

With reference to FIGS. 1 to 3, a Mac Pherson suspension strut comprises a shock absorber with a body 1 and a rod 2. A lower spring retainer 3 is mounted securely on the body of the shock absorber and a spring 4 is mounted between the lower spring retainer 3 and an upper spring retainer, not depicted.

The coil, spring 4 has a helical part 4a, a straight part 4b guided in translation in a configuration 3a, 3b forming a channel for translation in the direction T.

One end 4c of the spring, curved transversely with respect to the straight part 4b, is roughly perpendicular to this straight part 4b. The end 4c therefore extends transversely and roughly at right angles to the direction T of translation.

The end part 4c of the coil spring 4 has, at 5, an indexing arrangement produced in the form of an orifice through which an elastic pin 6 can pass. The elastic pin 6 can be positioned in one of the three orifices 7, 8 or 9 to position the end 4c of the spring with respect to the spring retainer 3.

Because the coil spring bears on the lower spring retainer 3 along the line 10, the spring can be shifted into a position corresponding to the orifice 7 or to the orifice 9 while at the same time keeping the line 10 pressing against the lower spring retainer 3.

This first embodiment allows the position of the spring to be adjusted with respect to the axis of the shock absorber in a simple and economical way, for example by shifting the end 4c using a mallet until it is in the chosen position corresponding to the desired adjustment of the inclination of the spring with respect to the axis of the shock absorber once the elastic pin 6 has been extracted.

With reference to FIGS. 4 to 6, a Mac Pherson suspension strut comprises a shock absorber with a body 11 and a rod 12, a lower spring retainer 13 secured to the shock absorber body 11, a coil spring 14 bearing on the lower spring retainer 13 and mounted between the lower spring retainer 13 and an upper spring retainer, not depicted.

The coil spring 14 has a circular end 14a, a straight end 14b and a curved end 14c roughly perpendicular to the straight end 14b. The straight end 14b is guided in translation in the direction T by a channel determined by two raised parts 13a and 13b of the lower spring retainer 13.

The end 14c roughly perpendicular to the direction of translation T has a curved and preferably tapered end 15. The curved end 15 can be inserted in an indexing orifice 16 chosen from the three orifices 16, 17 and 18 made in the lower spring retainer 13.

To move the spring 14 from one chosen position to another indexing position, a tool is inserted into the space 19 to lift the curved end 15 of the spring 14 and move it into a chosen position. Pressure is then exerted on the outer edge 20 of the bent end 15 to insert this end 15 into an orifice 17 or 18.

With reference to FIGS. 7 to 9, a Mac Pherson suspension strut comprises a shock absorber with a body 21 and a rod 22, a lower spring retainer 23 secured to the body of the shock absorber and a coil spring 24 mounted between the lower spring retainer 23 and an upper spring retainer, not depicted.

The spring 24 has a helical portion 24a, a straight portion 24b and an end 24c roughly perpendicular to the straight end 24b. The straight end 24b is guided in translation in the direction T by a configuration forming a translation channel delimited by a wave shape 13a and a rim 23b.

To move the spring 24 all that is required is for the end 24c to be moved in translation in the direction T. The end 24c is secured to the spring retainer 23 by a means 25 at least partially surrounding the end 24c. This means 25 preferably has a collar or curved-tab configuration capable of being fixed removably to the lower spring retainer 23. To do this, use is made, for example, of a screw 26, or a pin, or a bolt, or any other similar mechanical fastening means such as a rivet.

The screw 26 is screwed into an orifice 27 in the end of the curved tab 25 and into a corresponding hole or tapping 28, 29 or 30 made in the lower spring retainer 23.

Adjustment in this embodiment is carried out in a similar way to the way described with reference to the first embodiment of FIGS. 1 to 3, using a mallet or some other appropriate instrument able to make the spring 24 move. The screw 26 can be partially loosened to allow prior geometric adjustment, before the spring 24 is fastened in position using the curved tab 25.

The invention described with reference to three particular embodiments is not in any way restricted thereto but on the contrary covers any modification in form and any embodiment variant thereof which fall within the scope and spirit of the invention. The essential feature is that the spring 4, 14 or 24 have a configuration appropriate for allowing it to be moved in translation in a predetermined direction corresponding to it being guided by a corresponding configuration of the lower spring retainer 3, 13 or 23.

What is claimed is:

1. A strut for a Mac Pherson wheel suspension, comprising a shock absorber with a body (1, 11, 21) and a rod (2, 12, 22); said rod (2, 12, 22) being surrounded by a coil spring (4, 14, 24); said spring (4, 14, 24) being mounted between a lower spring retainer (3, 13, 23) secured to the shock absorber body (1, 11, 21) and an upper spring retainer through which the shock absorber rod passes; wherein the strut comprises means capable of immobilizing a first turn of the spring (4, 14, 24) on and with respect to the lower spring retainer (3, 13, 23) in various predetermined positions on said lower spring retainer (3, 13, 23); and wherein said spring (4, 14, 24) has one end (4c, 14c, 24c) extending transversely to a direction (T) of translation defined by the various predetermined positions and has a part (4b, 14b, 24b) which is roughly straight and parallel to the direction of translation.

2. The strut of claim 1, wherein said one end (4c, 14c) of said spring (4, 14) extending transversely to the direction (T) of translation has an indexing configuration (5, 15).

3. The strut of claim 2, wherein said indexing configuration (5) involves at least one orifice (5) through which a mechanical means (6) of connection to said lower spring retainer (3) can pass.

4. The strut of claim 2, wherein said indexing configuration involves at least one curved end (15) which can be inserted in an indexing orifice (16 to 18) chosen from a number of orifices (16–18) made in said lower spring retainer (13).

5. The strut of claim 1, wherein said end (24c) of said spring (24) extending transversely to the direction (T) of translation can be secured to said lower spring retainer (23) by a means (25) at least partially surrounding said end (24c).

6. The strut of claim 5, wherein said means (25) at least partially surrounding said end (24c) of said spring (24) is configured as a collar or curved tab.

7. The strut of claim 6, wherein said collar or curved tab configuration (25) has an end for fixing, by a mechanical coupling means (26), to said lower spring retainer (23).

8. The strut of claim 3, wherein said mechanical means (26) of coupling to said lower spring retainer (23) is a replaceable means of a screw, pin, bolt or similar type.

9. The strut of claim 1, wherein said straight part (4b, 14b, 24b) parallel to the direction (T) of translation is parallel to the direction of forward travel of a vehicle for which said strut is intended.

* * * * *